Jan. 12, 1971  H. SCHILL  3,554,831
METHOD FOR PRODUCING THIN-FOIL STRIPS
Filed Sept. 12, 1968  2 Sheets-Sheet 1
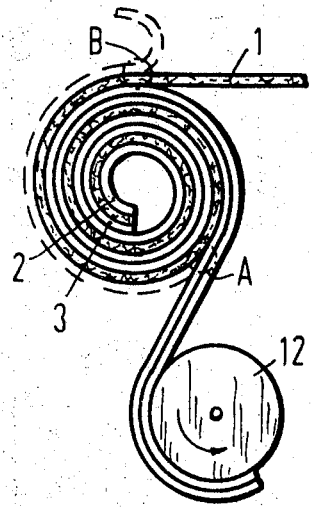
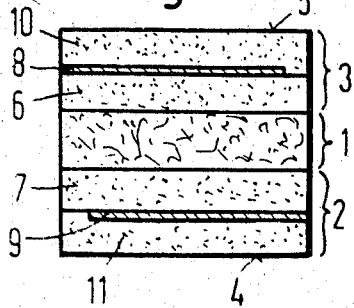
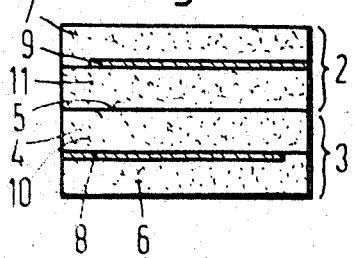
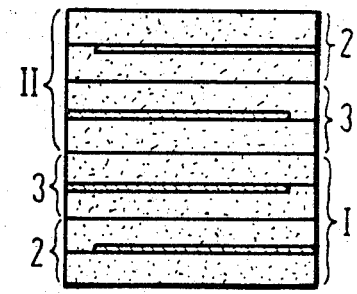
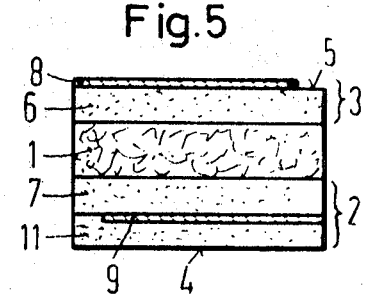
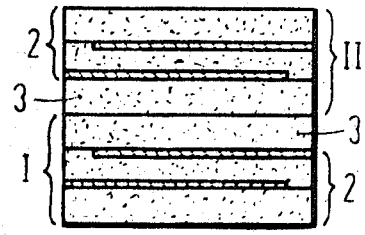
INVENTOR
HERMANN SCHILL
BY  Hill, Sherman, Meroni, Gross & Simpson
ATTORNEYS

INVENTOR
HERMANN SCHILL

United States Patent Office 3,554,831
Patented Jan. 12, 1971

3,554,831
METHOD FOR PRODUCING THIN-FOIL STRIPS
Hermann Schill, Regensburg, Germany, assignor to Siemens Aktiengesellschaft, Erlangen, Germany, a corporation of Germany
Filed Sept. 12, 1968, Ser. No. 759,404
Claims priority, application Germany, Sept. 25, 1967,
S 111,989
Int. Cl. B65h *81/00*
U.S. Cl. 156—184                                              7 Claims

ABSTRACT OF THE DISCLOSURE

Methods and processes for producing thin-foil strips by winding thin-foil strips onto an auxiliary carrier layer and then unwinding them so as to form a composite strip of foil layers.

BACKGROUND OF THE INVENTION

Field of the invention

This invention relates in general to methods and apparatus for producing thin-foil strips, as for example, for electric capacitors.

Description of the prior art

As shown by British Patent 949,155 it has been previously known to combine two thin-foils into one single strip. This patent teaches applying thin-foil strip to an auxiliary carrier layer and winding the composite into a roll. A second identical roll is formed and the two rolls are unrolled with the thin-foils placed next to each other and glued or joined together with heat, for example.

As shown in British Patent 965,331 it is also known to connect two thin-foils together with glue, for example. This patent shows, for example, two thin-foils which are unrolled from two different storage rolls and glued together.

SUMMARY OF THE INVENTION

According to the present invention an auxiliary layer has thin-foil layers applied to either side of it and the composite formed into a roll. This roll is then unwound and the auxiliary layer is removed and the two thin-foil layers on either side of the auxiliary layer are connected together to form a thin-foil strip composite. Various combinations of strips are formed by utilizing this process which is described in detail hereafter.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is an end view of the auxiliary layer and two thin-foil layers formed on either side of it, FIG. 2 is a sectional view showing an auxiliary layer between two thin-foil layers, FIG. 3 illustrates the two thin-foil layers with the auxiliary layer removed, FIG. 4 illustrates in section a pair of thin-foil composite layers such as illustrated in FIG. 3 connected together, FIG. 5 illustrates an auxiliary layer between two thin-foil layers, FIG. 6 illustrates a composite layer with the auxiliary layer removed.

DESCRIPTION OF THE PREFERRED EMBODIMENTS

Figure 7:
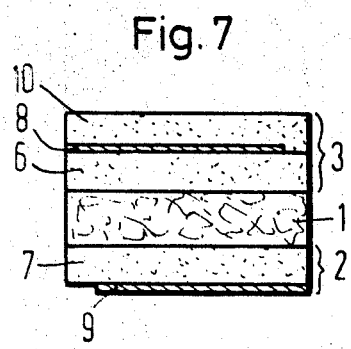
FIG. 7 illustrates thin-foil layers on either side of an auxiliary layer.

In the present invention an auxiliary carrier foil has two thin-foil layers formed on either side. The layers may be formed by metallizing and lacquering, for example, and the auxiliary carrier foil is wound into a storage roll with the thin-foils on both sides. The storage roll is then unwound and the two thin-foils are combined into a thin-foil composite on top of each and are removed from the auxiliary carrier roll. The invention allows strong thin-foil strips to be obtained which may be used for many different purposes such as for envelope foils for packaging or for electric capacitors. Various patterns may be applied by forming the metal foil in different shapes. Lacquer between the layers protects the foil from damage.

In the invention only one storage roll is required and during unwinding from the storage roll the thin-foils will lie on top of each other and will be joined together. The joining together may result from electrostatic force, or through solvent residues in the lacquer layers or other adhesives that are applied specifically for that purpose.

FIG. 1, for example, illustrates an auxiliary carrier layer 1 upon each side of which thin-foils 2 and 3 are applied. The foils are applied with lacquer and after the lacquer has been applied the auxiliary carrier roll is wound into a storage roll as shown. The storage roll is unwound while there are solvent residues in the lacquer and the two thin-foils 2 and 3 will stick together as they are unwound from the storage roll. If the storage roll has been formed in a dry state, electrostatic forces will cause the thin-foils 2 and 3 to stick together as they are removed from the storage roll.

As shown in FIG. 1 the thin-foils lie on top of each other as they are removed from the storage roll. As they are unwound the thin-foil 3 on the outside of the auxiliary layer 1 will be detached at point A and thin-foil 2 on the inside of auxiliary layer 1 will be detached at point B. The auxiliary foil 1 is wound on a takeup reel, not shown, and the two foil layers 2 and 3 are wound about storage roll 12.

FIG. 2 illustrates two thin-foils 2 and 3. These thin-foils consist of first lacquer layers 6 and 7 which are applied directly on the auxiliary carrier foil 1. Metallization designated by 8 and 9 may then be applied to the lacquer layers 6 and 7 through a suitable coating process and the protective lacquer layers 10 and 11 are then applied over the metallized layers 8 and 9. The composite is then rolled into a storage roll and then unwound, removing the carrier roll 1. The composite roll will be formed as shown in FIG. 1 to produce a strip such as shown in FIG. 3. Surface 4 will be attached to surface 5. The composite thin-foil strip formed as shown in FIG. 3 may then be wound to form an electric capacitor, for example. For this purpose the metal coatings 8 and 9 may extend to the edges of the thin-foil to allow electrical contacts to be attached.

FIG. 4 illustrates a further modification of the invention wherein two thin-foil strips designated by I and II each of which have been formed as shown in FIG. 3 are attached together. In other words, two composite thin-foils such as shown in FIG. 3 are attached to either side of an auxiliary roll 1 as shown in FIG. 1 and then unwound to place two of the composite foils of FIG. 3 together to form the structure of FIG. 4. In this case the finished capacitor may be wound from the storage rolls. If desired the thin-foil strips may be reeled onto a further roll, not shown, and then processed into a capacitor. Since the two thin-foil strips I and II lie on top of one another, if the surfaces of the lacquered layers which were lying immediately on top of one another on the auxiliary carrier foil contain wax, the two thin-foil strips I and II may be easily attached together by heating thus melting the wax which then sticks them together. It is to be noted that the thin-foil layer 3 which was on the outside of the auxiliary layer 1 will be joined together as shown in FIG. 4.

The electric capacitor formed according to FIG. 4 can be improved if the lacquer layers 6 and 7 directly on the auxiliary carrier layer is formed of a material which aids the regeneration ability of the capacitor. Acetyl cellulose is one such substance, for example. In the finished capacitor the lacquer layers lie in field-free space between metallization layers that are short-circuited through end contacts. So as not to impair the electrical insulation value of the capacitor electrical leads may be extended into the field-free space of the capacitor. For the lacquer layers 10 and 11 which are not in contact with the auxiliary carrier 1 materials are used which have good dielectric properties. For example, polystyrene is such a material.

FIG. 5 illustrates an auxiliary carrier 1 to which a thin-foil 3 comprising a lacquer layer 6 and a metallized layer 8 are attached on one side and a thin-foil 2 comprising two lacquer layers 7 and 11 with a metallization layer 9 between them is attached to the other side. The auxiliary carrier foil is wound onto the storage roll so that the thin-foil 2 lies (as shown in FIG. 1) on the inside and the thin-foil 3 lies on the outside. The two thin-foils are then unwound and connected together to form a composite thin-foil strip as shown in FIG. 1. Two such thin-foil strips I and II, thus formed, can then be formed into a capacitor construction such as shown in FIG. 6. In this case the two thin-foils 3 which were lying on the outside of the storage roll lie on top of each other. Surfaces which have been in contact with the auxiliary carrier foil rest on top of one another.

Figure 8:
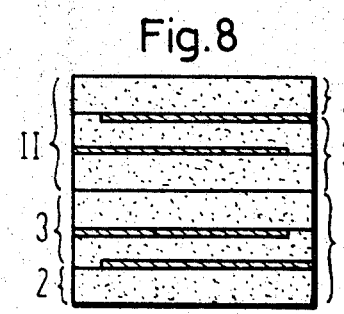
FIG. 8 illustrates a composite layer with the auxiliary layer removed.

FIG. 7 illustrates the carrier foil 1 with a thin-foil comprising two lacquer layers 6 and 10 and a metallized layer 8 between them on one side. On the other side of the auxiliary carrier foil a lacquer layer 7 and a metallized layer 9 are attached. The composite is reeled as shown in FIG. 1 with the thin-foil 3 lying on the outside and the thin-foil 2 on the inside. With the process of FIG. 1, the two thin-foils are connected together to form a thin-foil strip. Two such thin-foil strips identified by I and II can be processed to form a capacitor as shown in FIG. 8. In this instance the two thin-foils 3 are on top of each other with the lacquers 6 joining them together. The two lacquer layers 6 will lie in field-free space between two short-circuited plates. These lacquer layers may be formed of material which improves the regeneration ability of the capacitor, such as acetyl cellulose. In this capacitor construction points which possibly occurred during metallizing may extend into field-free space also. With this capacitor the advantage is obtained that only one lacquer layer is located in the electric field between plates with opposite polarity. Materials with good dielectric qualities may be selected for this lacquer layer without considering their regeneration qualities. For example, polystyrene or polyphenylene oxide may be used.

Figure 10:
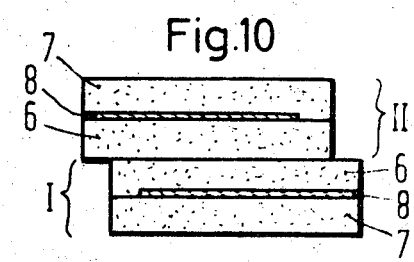
FIG. 10 illustrates a composite thin-foil layer with the auxiliary layer removed.
Figure 9:
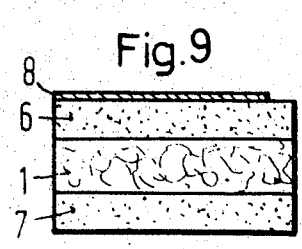
FIG. 9 illustrates an auxiliary layer between two layers.

FIG. 9 illustrates auxiliary carrier layer 1 with a lacquer layer 7 applied on one side and a lacquer layer 6 to which a metallized layer 8 is attached applied to the other side. According to the process illustrated in FIG. 1 a thin-foil strip may be formed and the lacquer layer 7 will overlay the metallized layer 8. Two such strips thus formed identified by I and II in FIG. 10 may be joined together to form the capacitor structure illustrated in FIG. 10.

Figure 11:
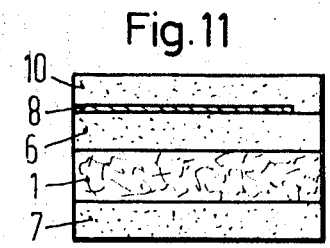
FIG. 11 illustrates an auxiliary layer between thin-foil layers and FIG. 12 illustrates a composite thin-foil with the auxiliary layer removed.
Figure 12:
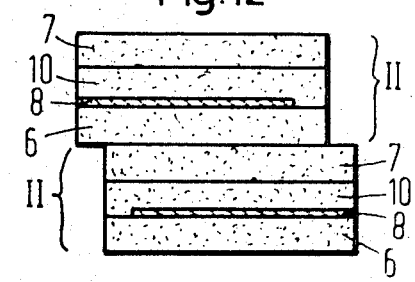

FIG. 11 illustrates an auxiliary carrier layer 1 which has a lacquer layer 7 attached to one side and a composite layer comprising the lacquer layers 6 and 10 with a metallized layer 8 between them attached to the other side. The lacquer layers 6 and 10 with the metallized layer 8 between them may be formed as shown in FIG. 9, for example. The layer 7 may be attached to the layer 10 by utilizing the process of FIG. 1 and two such composite structures may be joined together as shown in FIG. 12 to form a capacitor structure.

In the figures two thin-foil strips I and II are spooled together into a capacitor in such a manner that they are lying on top of one another with the thin-foils 3 lying on the inside.

It is possible to place the thin-foil strips I and II on top of one another with the thin-foils 2 lying on the outside of the storage rolls by using a different arrangement of the storage roll on the winding machine. The thin-foil strip lying on the outside can also be joined together with the thin-foil strip of another thin-foil strip lying on the inside. The choice of the coating on the free edges of the strips determine the regeneration ability and dielectric qualities.

Although minor modifications might be suggested by those versed in the art, it should be understood that we wish to embody within the scope of the patent warranted hereon all such modifications as reasonable and properly come within the scope of our contribution to the art.

I claim as my invention:

1. A process for the production of a thin-foil strip composed of thin-foils comprising applying strips of lacquer layers and metallization layers upon an auxiliary carrier foil, removing said lacquer layers and metallization layers with the strips of thin-foil are placed on top of one another and attached to each other in which the auxiliary carrier foil with the thin-foils on both sides is rolled onto a storage roll, and the storage roll is unwound with the two thin-foils lying on top of one another combined to a strip as they are detached from the auxiliary carrier foil.

2. A process according to claim 1, wherein said lacquer layers are formed on either side of the auxiliary carrier foil and metallization layers are formed on each lacquer layer and second lacquer layers are applied over the metallization layers.

3. A process according to claim 1 in which a first lacquer layer is formed on one side of the auxiliary carrier foil and a metallization layer is formed on the lacquer layer, and on the other side of the auxilairy carrier foil two lacquer layers with a metallization between them are attached.

4. A process according to claim 2, wherein the first lacquer layer is formed of a material which supports the regeneration ability of a capacitor, and as second lacquer layers materials with good dielectric qualities are applied.

5. A process according to claim 4, wherein the first lacquer layers are acetyl cellulose, and the second lacquer layers are polystyrene.

6. A process according to claim 1, wherein on each of the two sides of the auxiliary carrier foil, lacquer layers are applied and one of these lacquer layers is metallized.

7. A process according to claim 1, wherein a nonmetallized lacquer layer is attached to one side of the auxiliary carrier foil and two lacquer layers with metallization embedded between them are applied to the other size of the auxiliary carrier foil.

References Cited

UNITED STATES PATENTS

| | | | |
|---|---|---|---|
| 3,221,227 | 11/1965 | Devaney | 156—184X |
| 3,306,798 | 2/1967 | Gaenge | 156—233X |
| 3,334,002 | 8/1967 | Heywang | 156—233X |
| 3,374,515 | 3/1968 | Girard | 156—233X |
| 3,410,744 | 11/1968 | Bold et al. | 156—233 |

LELAND A. SEBASTIAN, Primary Examiner

U.S. Cl. X.R.

156—190, 233; 317—258